United States Patent [19]
Cruze, Jr.

[11] 3,820,658
[45] June 28, 1974

[54] SELF CLEANING FILTER APPARATUS AND SYSTEM

[75] Inventor: Alonzo J. Cruze, Jr., Jacksonville, Fla.

[73] Assignee: Dixie Water Treatment Company, Jacksonville, Fla.

[22] Filed: July 5, 1972

[21] Appl. No.: 269,147

[52] U.S. Cl............... 210/104, 210/108, 210/196, 210/275, 210/290
[51] Int. Cl............................................ B01d 23/16
[58] Field of Search ............. 210/80, 104, 108, 141, 210/196, 258-260, 274, 275, 279, 290

[56] References Cited
UNITED STATES PATENTS

| | | | |
|---|---|---|---|
| 656,403 | 8/1900 | Paterson | 210/108 |
| 1,942,808 | 1/1934 | Dotterweich | 210/279 X |
| 3,178,024 | 4/1965 | Jacuzzi | 210/258 X |
| 3,220,553 | 11/1965 | Growall et al. | 210/108 |
| 3,335,868 | 8/1967 | Schiffers | 210/274 |
| 3,339,736 | 9/1967 | Muller | 210/104 |
| 3,534,855 | 10/1970 | Guillerd et al. | 210/80 X |

*Primary Examiner*—John Adee
*Assistant Examiner*—Robert H. Spitzer
*Attorney, Agent, or Firm*—George H. Baldwin; Arthur G. Yeager

[57] ABSTRACT

An intermittently operated pump passes waste fluid through a check valve into an upflow closed filter tank apparatus to produce clean fluid which may be used or discharged. When the pump stops a valve opens and the clean fluid then remaining in the tank is forcibly back washed by the air pressure in the tank through the filter material and through the valve back to a source. An adjustable pressure valve is in line with the clean fluid discharge and an air check valve passes air into the tank after each back washing occurrence. A float and switch controls actuation of the pump and the closing of the valve.

12 Claims, 1 Drawing Figure

PATENTED JUN 28 1974 3,820,658
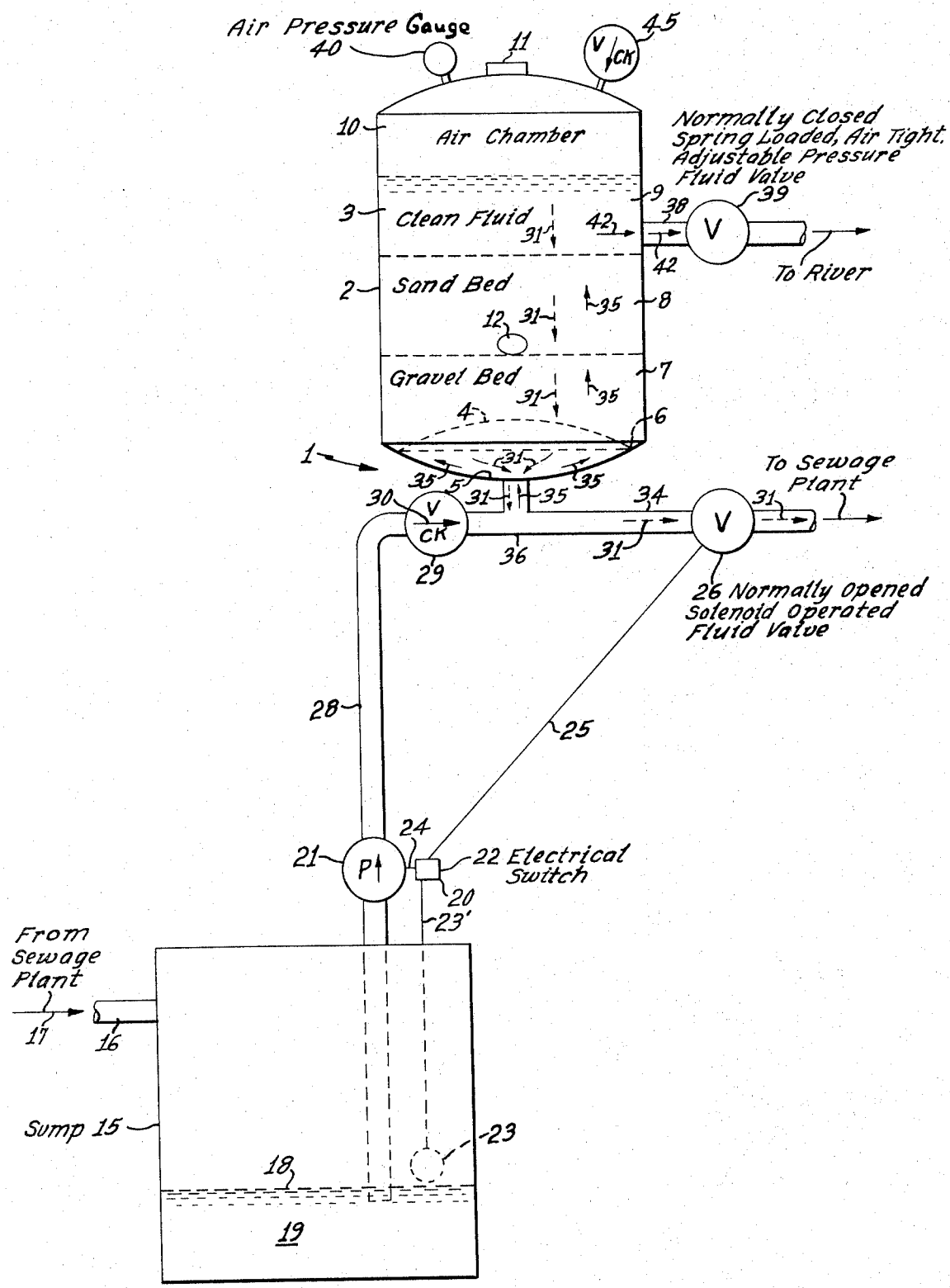

SELF CLEANING FILTER APPARATUS AND SYSTEM

BACKGROUND OF THE INVENTION

1. Field of the Invention

This invention relates to filter apparatus and systems thereof and more particularly to an improved self cleaning filter system in which the filtering therein is intermittent.

2. Description of the Prior Art

There have been many attempts in the prior art to provide an automatic and self-cleaning operation of a filter system which is both simple and effective. Illustrative of such prior art are the following U.S. Pat. Nos.: 395,625, Moore; 415,648, Mather; 656,043, Paterson; 2,723,761, Van der Made et al; 3,061,100, Fehlmann; 3,289,839, Muller; 3,327,855, Watson et al; 3,335,868, Schiffers; 3,339,736, Muller; 3,502,212, Ueda; and 3,512,640, Hellmann.

SUMMARY OF THE INVENTION

In one of the aspects of this invention the filter system includes a closed filter tank apparatus and a pump for passing waste fluid from the sump means through a first conduit means and a check valve means into the filter tank, the check valve establishing a one way fluid path toward the filter tank. A second conduit means communicates between the filter tank and source with a selectively operated valve means interposed therein between the filter tank and source. Means are responsive to a predetermined condition of the sump for activating the pump and closing the selectively operated valve means whereby the waste fluid passes into the filter tank. A normally closed air tight fluid pressure valve means is in line with the discharge clean fluid outlet of the tank. An air chamber is above the filter material chamber in the tank and the air tight fluid pressure valve means automatically opens when the pressure in the air chamber reaches a predetermined pressure. When the pump stops and the selectively operated valve means opens by operation of the means responsive to a predetermined condition of the sump, the clean fluid remaining in the filter tank is blown back or back washed through the filter material to cleanse same.

Other aspects of the invention are disclosed wherein the system includes a normally open air control valve means communicating with the filter tank for passing air into the tank after each back washing occurrence. The air tight fluid pressure valve means includes spring loaded pressure relief valve and means to adjust the fluid pressure that operates to open said valve. The selectively operated valve means includes a normally open hydraulic valve and a spring loaded solenoid for operating same. The means responsive to a predetermined condition of the sump has an electrical switch in series with the solenoid and a float in the sump to operate the switch.

Yet other aspects are directed to the system wherein the filter apparatus is an upflow filter apparatus with the first and second conduit means communicating with the filter apparatus adjacent the bottom thereof and a means for distributing the waste fluid inflow is beneath the filter beds. The discharge outlet thus communicates with the tank above the filter material level therein. The first and second conduit means communicate with each other and the check valve means prevents any back wash from passing into the pump.

A general object of the present invention is to provide an improved self cleaning filter system.

A particular object is the provision of closed filter tank in which clean fluid remaining in the tank is blown back or back washed through the filter material every time the intermittently operated pump stops.

A specific object is to provide an improved filter system that is simple in design and easily constructed, inexpensively manufactured and maintained, and durable and efficient in use.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

The FIGURE is a diagrammatic view of the self cleaning filter apparatus and system in accordance with the invention.

DETAILED DESCRIPTION OF THE PREFERRED EMBODIMENT

Referring now more particularly to the drawing, the filter system is generally indicated by reference 1 and includes an upflow filter apparatus 2 having a cylindrical tank 3 with a dome head distributor 4 therein suitably spaced away from the inside of the tank bottom 5 to provide a generally annular space 6 between distributor 4 and bottom 5. A typical dimension for space 6 is on the order of ¼ inch while the gravel bed 7 may be filled with gravel of the size of approximately ½ inch. A coarse sand bed 8 is provided above gravel bed 7 with a clean fluid chamber 9 and an air chamber 10 completing the inside of tank 3. The tank 3 is a closed one so that the air within the tank 3 is compressed by the fluid being pumped. A normal type of loading access door 11 is provided to replace and/or replenish the filter beds 7 and 8, and a clean out plug is also provided for appropriate servicing of the filter apparatus 2.

While the filter system 1 will be described, generally depicted and employed as the tertiary filter in a sewage treatment plant, it is to be understood that this filter system may be employed as, for example, a swimming pool filter or in many other systems which will be apparent to those skilled in the art. Waste fluid from a source (not shown) is supplied to the sump 15 through conduit 16 as indicated by arrow 17, as by gravity or a pump in a well known manner. The level of the sump 15 will normally be as indicated at 18, and as the waste fluid 19 therein rises sufficiently, means, generally indicated at 20, being responsive to a predetermined condition of sump 15, is rendered operative to activate the motor driven suction pump 21 for withdrawing waste fluid from sump 15. The means 20 is seen to include a suitable source of electrical energy (not shown) and an electrical switch 22 which is turned on and off by the float 23 suitably mechanically connected by a rod 23' or the like, switch 22 being electrically connected through line 24 to pump 21 for activating same and through line 25 to activate the solenoid (not shown) of the normally opened solenoid operated fluid valve 26 to close same during pumping of the waste fluid by pump 21.

A first conduit means 28 is provided between sump 15 and filter apparatus 2 with the pump 21 interposed therebetween. Between pump 21 and filter apparatus 2 is disposed a fluid check valve means 29 in conduit means 28 for establishing a one way waste fluid path toward filter apparatus 2 in the direction of arrow 30 whereby the back washing fluid, illustrated by broken arrows 31, is blocked from passage back through conduit means 28 and pump 21 to the sump 15, as hereinafter more fully described.

A second conduit means 34 communicates between filter apparatus 2 and the source (not shown) of the sewage treatment plant, it being understood that such a source may be the primary, secondary or other treatment portions of such a sewage treatment plant or the like. A selectively operated valve means 26, in the form of a normally opened solenoid operated spring loaded fluid valve, is interposed in the second conduit means 34 between the filter apparatus 2 and the source. Thus, with the pump 21 operating, valve 26 is closed and the waste fluid is directed through the first conduit means 28 through check valve 29 and into the filter apparatus 2, as illustrated by full arrows 35. The first and second conduit means 28 and 34 are seen to communicate with each other and the filter apparatus 2 by a T-connector 36 or the like which is fitted to tank bottom 5 adjacently beneath distributor 4.

A discharge outlet 38 is positioned remotely above the filter materials in beds 7 and 8 for passing the filtered and clean fluid from chamber 9 therethrough after a predetermined pressure is achieved in closed tank 3. An air tight, fluid pressure valve means 39 is in fluid communication with discharge outlet 38 and this means 39 is normally closed but automatically opens when the air pressure in the tank 3 reaches, for example, 25 psi. Valve means 39 includes a spring loaded pressure relief valve which may be adjusted to open at various setable positions by adjustment of the spring tension or compression in a manner well known in the art. A pressure gauge 40 is connected to the tank 3 in air communication with air chamber 10 so that the pressure in the tank 3 may be determined to appropriately adjust valve means 39. Thus, with the pump 21 on and the waste fluid passing through the filter beds 7 and 8, the clean fluid in chamber 9 after appropriate build up of pressure in tank 3, the clean fluid will pass in the direction of arrows 42 through the open valve means 39 into the river or other discharge receiving means.

An air control check valve means 45 is in air communication with the air chamber 10 for passing air from the atmosphere into the tank 3 after each of the back washing occurrences. When the pump 21 is stopped by switch 22 (the fluid level in sump 15 drops sufficiently to drop the float 23 and deactivates switch 22) which also opens valve 26, the clean fluid then remaining in chamber 9 back washes through the filter beds 8 and 7 and the back wash fluid together with debris and other materials initially trapped in such beds is passed from tank 3 out through second conduit means 34 and open valve 26 back to the sewage plant. Thus, each time the intermittent operated pump 21 is stopped, the filter apparatus is back washed resulting in a substantial increase in the useability and life of the filter materials before requiring renewal or replacement thereof.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a filter system comprising a closed filter apparatus having an inlet chamber, a clean fluid chamber and filter material separating said inlet chamber from said clean fluid chamber, a pump for pumping the waste fluid from a source to said inlet chamber, first fluid conduit means communicating between said pump and said inlet chamber, check valve means interposed in said first conduit means between said pump and said inlet chamber for establishing a one way fluid path toward said inlet chamber, a second fluid conduit means communicating with said inlet chamber for removing back wash fluid and the waste in the filter material, a selectively operated valve means in said second conduit means for controlling the flow of fluid and waste therethrough, means for intermittently activating and deactivating said pump and closing and opening said selectively operated valve means, said filter apparatus having an air chamber communicating with said clean fluid chamber and a discharge outlet communicating with said clean fluid chamber, a normally closed air tight fluid pressure responsive valve means in communication with said discharge outlet and automatically opening to permit egress of clean fluid produced by pumping the waste fluid through the filter material out through said discharge outlet when the pressure in said clean fluid chamber reaches a predetermined pressure, said means for intermittently activating and deactivating said pump being operable to deactivate said pump and open said selectively operated valve means, the air in the air chamber and the clean fluid remaining in said clean fluid chamber forcibly back washing the filter material upon deactivation of said pump with the back wash fluid and the waste in the filter material passing through said second conduit means and open selectively operated valve means.

2. In the system as defined in claim 1 further comprising an air control valve means communicating with said filter apparatus for passing air into said air chamber of said filter apparatus after each back washing occurrence.

3. In the system as defined in claim 1 wherein the filter material includes a gravel bed and a sand bed.

4. In the system as defined in claim 1 wherein said air tight fluid pressure responsive valve means includes a valve and means to adjust said valve to open under various fluid pressures.

5. In the system as defined in claim 1 wherein said air tight fluid pressure responsive valve means includes a spring loaded fluid pressure relief valve.

6. In the system as defined in claim 1 wherein said first and second conduit means communicate with each other with said check valve means preventing any back wash fluid from passing into said pump.

7. In the system as defined in claim 1 wherein said filter apparatus is an upflow filter apparatus, said first and second conduit means communicating with said inlet chamber of said filter apparatus adjacent the bottom thereof.

8. In the system as defined in claim 7 wherein said discharge outlet communicates with said clean fluid chamber of said filter apparatus above the filter material level therein.

9. In the system as defined in claim 7 wherein said filter apparatus includes means disposed in said inlet chamber for distributing the waste fluid inflow beneath the filter material therein.

10. In the system as defined in claim 1 further comprising a sump fluidly communicating between said source and said pump, said means for intermittently activating and deactivating including means responsive to a predetermined condition of said sump.

11. In the system as defined in claim 10 wherein said selectively operated valve means includes a normally open hydraulic valve and a spring loaded solenoid for operating said valve, said means responsive to a predetermined condition of said sump includes an electrical float switch in series with said solenoid.

12. In the system as defined in claim 10 wherein said pump is an electrical motor driven pump, said means responsive to a predetermined condition of said sump includes a float member within said sump and an electrical switch operated by said float member, said switch being electrically connected to said pump for activating and deactivating same.

* * * * *